United States Patent Office 2,761,411
Patented Sept. 4, 1956

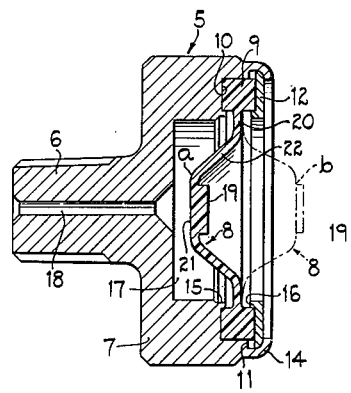

2,761,411

PRESSURE INDICATING DEVICE

William C. Pross, Bainbridge, and Adelbert H. Ryon, Sidney, N. Y., assignors to Bendix Aviation Corporation, New York, N. Y., a corporation of Delaware Application September 29, 1952, Serial No. 312,044

10 Claims. (Cl. 116—34)

This invention relates to indicating apparatus and more particularly to a device for indicating the occurrence of pressure.

One of the objects of the present invention is to provide a novel device which is adapted for use as an indicator of the occurrence of fluid pressure.

Another object is to provide a novelly constructed device which will indicate the occurrence of a pressure differential above a predetermined value either during or following such occurrence.

A further object is to provide a simple and inexpensive device of the above character which may be readily and easily reset manually and which may be constructed to operate in response to relatively small pressure differentials.

Still another object is to provide a novel device of the above character the operation of which is not appreciably affected by temperature changes or by vibration, moisture, oil, gasoline or the like.

The above and further objects and novel features of the present invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is an axial section of one form of apparatus embodying the invention;

Fig. 2 is a view like Fig. 1 showing the same apparatus with an added part; and

Fig. 3 is an end view of the device shown in Fig. 2.

The embodiments of the invention illustrated in the drawings, by way of example, are in the form of devices adapted for indicating the presence or occurrence of gaseous pressure in excess of a predetermined magnitude which may be very small. This type of device is especially useful, for example, for detecting and indicating the occurrence of pressure in places which are inaccessible at the time of such occurrence. One common and practical use for this device is in conjunction with supercharged chambers of ignition devices on aircraft engines. As a general rule an ignition distributor, for example, is inaccessible on an aircraft engine during engine operation and there has not heretofore been any practical means for detecting and recording the occurrence of pressure therein. Accordingly, there can be no ready assurance that the pressurizing system is functioning properly or that adequate pressure is attained during engine operation.

The novel device provided by this invention is capable of detecting a pressure above a predetermined minimum and permanently indicating the occurrence of such pressure until reset to normal position. The pressure responsive element is not appreciably affected either physically or in its operation by temperature changes and vibration to which it is subjected on an aircraft engine. In the form shown in Fig. 1, said device comprises a cup-like metallic casing 5 having an externally threaded neck or nipple 6 and a recessed portion 7. The neck is adapted to engage a threaded opening in the wall of a compartment or chamber (not shown) to be charged with air under pressure. For example, it may be mounted on an engine ignition distributor which is super-charged only when the engine is operating.

Mounted across the mouth of the recessed end of casing 5 is a novel diaphragm 8 which functions as the pressure detecting and indicating means. The diaphragm 8 is made of natural or synthetic rubber, the specific material being dependent upon its use. For use on internal combustion engines, neoprene has been found desirable due to its resistance to attack by gasoline and oil and by reason of the fact that its physical properties are not materially affected by variations in temperature and other conditions. The peripheral edge portion of diaphragm 8 is flanged to provide a heavy rim 9 seated on an annular shoulder 10. The surface of said rim extends outwardly beyond a shoulder 11 and is engaged by a washer 12. The latter is held in place by a rolled-in flange or lip 14 on casing 5 so as to tightly compress rim 9 between shoulder 10 and washer 12 for forming an air-tight seal. Said shoulder and washer may be provided with oppositely facing lips 15 and 16, respectively, to further confine rim 9. Recessed casing 5 and diaphragm 8 thus cooperate to form a chamber 17 which is in continuous communication with a pressurizable chamber through a passage 18 in neck portion 6.

Diaphragm 8 is novelly constructed for the purpose of enabling it to accomplish the desired results. The construction is such that the central portion of said diaphragm may be moved between extreme positions $a$ and $b$ through a central position from which it moves with a snap-action. For this purpose a central portion of the diaphragm is thickened and hence stiffened by an integral button or boss 19. This central thickened portion 19 and rim 9 are joined by a relatively thin walled annular section comprising an outer ring 20 which is in the plane of rim 9, an inner ring 21 in a plane parallel to ring 20, and a frustro-conical portion 22 which offsets center button 19 from the plane of rim 9 and ring 20, so that the diaphragm as a whole bulges into recess or chamber 17 when it is in position $a$. The diaphragm is originally molded to this shape and is accordingly unstressed when in position $a$.

Whenever the pressure differential between the gaseous pressure communicated to chamber 17 through passage 18 and the atmospheric pressure acting on the outer face of the diaphragm exceeds a predetermined amount, the diaphragm will be moved past its center position and snap outwardly to position $b$. Until there is an oppositely acting pressure differential, the diaphragm will remain in position $b$ independently of whether the actuating pressure within chamber 17 is maintained. In this position ring 20 is under only small if any stress. Thus, if the diaphragm is activated by pressure within chamber 17 during engine operation, for example, it will remain in position $b$ even after the engine or other pressure generating means has ceased to operate, thereby indicating to the operator that the pressurizing system was functioning during engine operation. The operator can then manually restore the diaphragm to position $a$, i. e., to its normal or molded position.

The minimum pressure differential which is effective to move diaphragm 8 from one of its extreme positions to the other is determined by the composition of the diaphragm and the size thereof. Having selected the composition and specific design, skilled artisans will have no difficulty in determining the required size of a diaphragm to function at or about a selected pressure differential.

In most applications of this type of indicator, the desired result is attained even though the range of pressures required to operate the diaphragm under different conditions may be relatively wide.

In some instances it may be desirable to complement the rubber or rubber-like diaphragm 8 with a bent metallic strip 23 which will also function with a snap-action between extreme positions. Said strip may be made of light spring metal and the ends thereof are suitably anchored, such as between washer 12 and diaphragm rim 9. This embodiment is useful where the minimum pressure desired to be indicated is relatively high. Although metal may be satisfactorily used in this way, a diaphragm which is made entirely of metal is not satisfactory because it is less sensitive to low pressures and its essential properties vary too greatly with temperature variations and other variations in operating conditions.

There is thus provided a dependable device for detecting and indicating the presence or occurrence of fluid pressures, the same being fabricated from only a minimum number of very simple parts. The device is exceedingly small and simple both in construction and operation as compared to prior known structures for the same purpose and accordingly occupies a small space. Having only one moving part which is readily replaceable, the life of the device is substantially infinite.

Although only a limited number of embodiments of the invention are illustrated in the drawing and described in the foregoing specification, it is to be expressly understood that the invention is not limited thereto. For example, the rolled lip fastening means may be replaced by any of many well known and equivalent means for securing the diaphragm in the casing. Various other changes may also be made in the design and arrangement of the parts illustrated without departing from the spirit and scope of the invention as will now be clear to those skilled in the art.

What is claimed is:

1. Pressure responsive apparatus comprising a rigid member having an opening therein and an over-center snap-action diaphragm of rubber-like material secured across said opening, said diaphragm when unstressed having the central movable portion thereof bulged to one side of the plane of said opening, said central movable portion when pressed through said plane being adapted to bulge in the opposite direction and retain such position without continued application of pressure thereto.

2. Apparatus as defined in claim 1 wherein said rubberlike material is synthetic rubber, such as neoprene.

3. Apparatus as defined in claim 1 wherein said diaphragm has a heavy peripheral rim fixedly secured to said member at the periphery of said opening, a heavy central portion axially offset from said plane and a thin walled section connecting said rim and central portion, the latter having a flat ring portion extending inwardly from said rim and a frusto-conical portion connected to the inner edge of said ring.

4. Apparatus as defined in claim 3 wherein said thin walled section includes a flat ring portion extending radially outward from said central portion and connected at its outer edge to said frustro-conical portion.

5. Apparatus as defined in claim 1 comprising a buckled strip of flexible spring metal extending diametrically across said opening and anchored at its ends at the periphery of said opening.

6. A pressure responsive device comprising a casing having a recess therein adapted to be connected to a source of fluid pressure, a diaphragm of flexible rubber-like material secured in a fluid-tight manner across the mouth of said recess to form a pressure chamber, said diaphragm comprising a relatively stiff peripheral rim, a relatively stiff central portion and a relatively thin flexible section connecting said rim and central portion, said section comprising a ring extending radially inwardly from said rim, a ring extending radially outwardly from said central portion and a frustro-conical portion connecting said rings.

7. A molded snap-action diaphragm of rubber-like material comprising a relatively stiff central portion and a relatively thin flexible portion including a first ring section extending radially outwardly from said central portion, a frustro-conical section connected to the outer edge of said first ring section and a second ring section parallel to said first ring section and extending radially outwardly from the outer edge of said frustro-conical section.

8. A snap-action diaphragm as defined in claim 7 comprising a heavy rim surrounding and connected with said second ring section, said thin flexible portion being adapted to hold said central portion in either of two extreme positions at opposite sides of the central plane of said rim.

9. A pressure responsive device comprising a rigid member having an opening, and a molded rubber-like diaphragm secured across said opening, said diaphragm having the ability in response to pressure thereon to snap into and remain unassisted in either of two extreme positions at opposite sides of the plane of said opening.

10. A pressure responsive device as defined in claim 9 wherein the movable portion of said diaphragm comprises a relatively stiff central section and a relatively thin walled frustro-conical section.

References Cited in the file of this patent

UNITED STATES PATENTS

| | | |
|---|---|---|
| 1,618,211 | McNatt | Feb. 22, 1927 |
| 1,644,193 | Kennedy | Oct. 4, 1927 |
| 1,731,632 | Main | Oct. 15, 1929 |
| 1,846,311 | Clare | Feb. 23, 1932 |
| 2,655,894 | Rabbitt | Oct. 20, 1953 |